US012141576B2

(12) United States Patent
Landi et al.

(10) Patent No.: US 12,141,576 B2
(45) Date of Patent: Nov. 12, 2024

(54) SEPARATE RELATIONSHIP MANAGEMENT FOR APPLICATION DATA OBJECTS

(71) Applicant: Amazon Technologies, Inc., Seattle, WA (US)

(72) Inventors: Michael George Landi, Farmingdale, NY (US); Matthew Roy Noble, Seattle, WA (US); Ryan D. Dawkins, Seattle, WA (US); Shaun Levin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 17/489,488

(22) Filed: Sep. 29, 2021

(65) Prior Publication Data

US 2023/0095230 A1    Mar. 30, 2023

(51) Int. Cl.
  *G06F 8/70*    (2018.01)
  *G06F 8/71*    (2018.01)
  *G06F 8/73*    (2018.01)
  *G06F 16/23*   (2019.01)
  *G06F 16/242*  (2019.01)

(52) U.S. Cl.
  CPC .............. *G06F 8/71* (2013.01); *G06F 8/73* (2013.01); *G06F 16/2358* (2019.01); *G06F 16/244* (2019.01)

(58) Field of Classification Search
  CPC .......... G06F 8/71; G06F 8/73; G06F 16/2358; G06F 16/244; G06F 8/70
  See application file for complete search history.

(56) References Cited

U.S. PATENT DOCUMENTS

| | | | |
|---|---|---|---|
| 6,411,922 B1* | 6/2002 | Clark ..................... | G06Q 10/04 703/2 |
| 9,183,120 B1* | 11/2015 | Webb ....................... | G06F 8/76 |
| 9,513,780 B2* | 12/2016 | Scott ...................... | G05B 15/02 |
| 9,515,909 B2 | 12/2016 | Bernardini et al. | |
| 10,671,639 B1* | 6/2020 | Acheson ............. | G06F 16/2246 |
| 10,803,512 B2 | 10/2020 | Cook et al. | |
| 2006/0031203 A1* | 2/2006 | Rosenbaum ........ | G06F 16/9024 |
| 2007/0069857 A1* | 3/2007 | Utaka ................. | G06K 7/0008 340/10.1 |
| 2007/0300167 A1* | 12/2007 | Kadur ...................... | G06F 8/38 715/762 |
| 2008/0065580 A1 | 3/2008 | Spence et al. | |
| 2012/0254842 A1* | 10/2012 | Henderson ............... | G06F 8/76 717/136 |
| 2013/0145343 A1* | 6/2013 | Warren ..................... | G06F 8/30 717/101 |
| 2016/0085798 A1* | 3/2016 | Wu ..................... | G06F 16/2455 707/690 |

(Continued)

*Primary Examiner* — Jae U Jeon
(74) *Attorney, Agent, or Firm* — S. Scott Foster; Kowert, Hood, Munyon, Rankin & Goetzel, P.C.

(57) ABSTRACT

A separate relationship management interface for applications that utilize application data objects to implement various application features is used to track changes to relationships between application data objects. Requests that cause writes corresponding to relationships between application data objects and requests that cause reads of relationships between application data objects may be handled using an interface that interacts with a separate data store tracking the relationships between application data objects.

20 Claims, 16 Drawing Sheets

(56) References Cited

U.S. PATENT DOCUMENTS

| | | | | |
|---|---|---|---|---|
| 2016/0171042 | A1* | 6/2016 | Bendel | G06F 16/214 |
| | | | | 707/703 |
| 2017/0017710 | A1* | 1/2017 | Kaminsky | G06F 16/284 |
| 2018/0089299 | A1* | 3/2018 | Collins | G06F 16/2365 |
| 2019/0026334 | A1* | 1/2019 | Ma | G06F 16/9027 |
| 2019/0042149 | A1* | 2/2019 | Kesler | G06F 9/30 |
| 2019/0058661 | A1* | 2/2019 | Levy | H04L 49/3009 |
| 2019/0324989 | A1* | 10/2019 | Borochoff | G06F 16/9024 |
| 2021/0149734 | A1* | 5/2021 | Gurfinkel | G06F 9/4843 |

\* cited by examiner

SEPARATE RELATIONSHIP MANAGEMENT FOR APPLICATION DATA OBJECTS

BACKGROUND

Applications may record information to perform various operations and support different features using diverse application data objects. Different relationships between the application data objects may include information also used to implement different operations of features of an application. As applications grow in size and complexity the number of application data objects to maintain may also grow, increasing demands upon applications to efficiently utilize application data objects.

Figure 1:
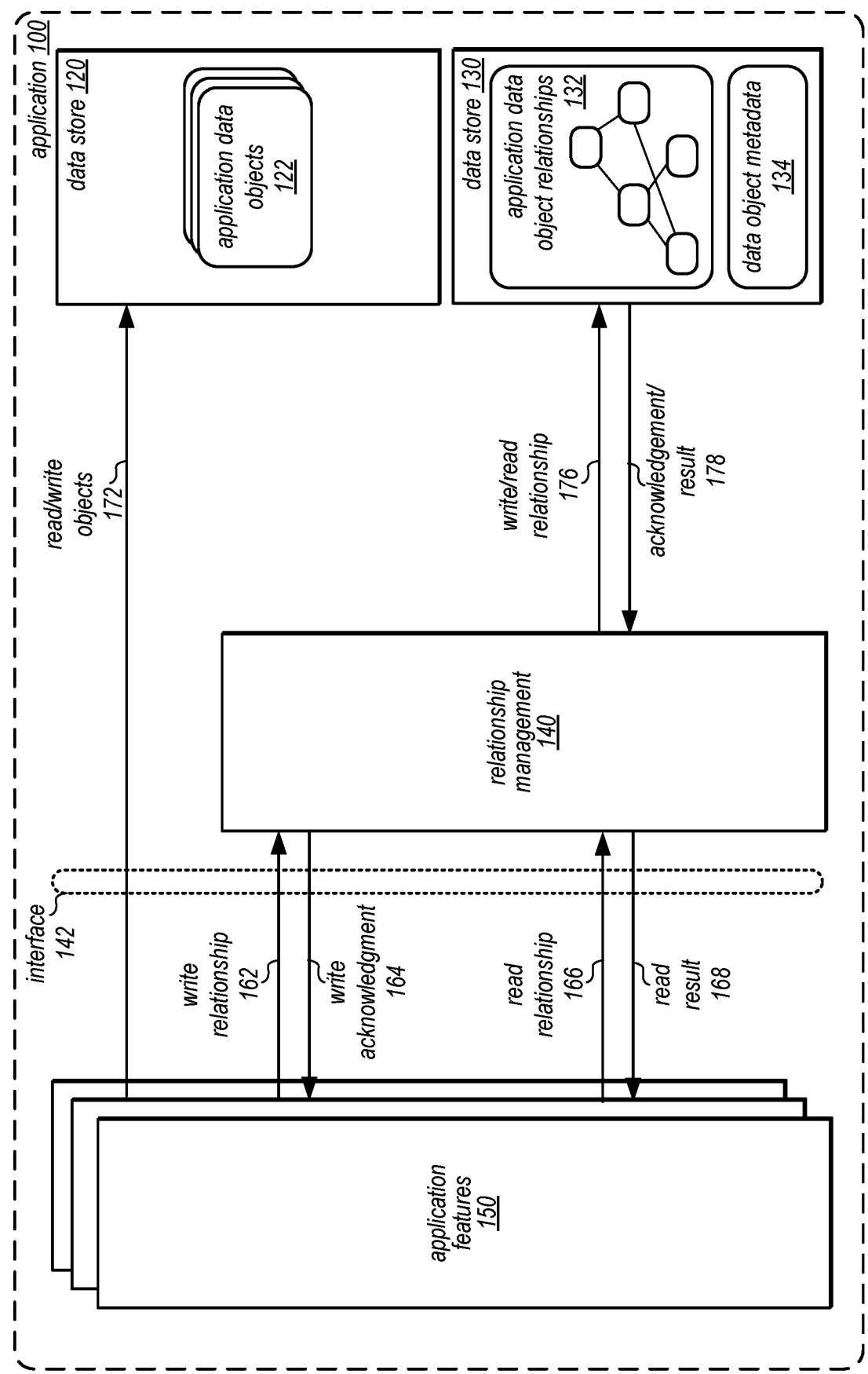
FIG. 1 is a block diagram illustrating separate relationship management for application data objects, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for separate relationship management for application data objects are described herein. Applications may implement and manipulate various application data objects (e.g., various data records, structures, or application data values that maintain state, instructions, or other information) used to implement various application features. For example, an application development system or service similar to application development, build, delivery, and deployment service 210 discussed below with regard to FIG. 2, may use application data objects that correspond to different resources of the application (e.g., resource documents). In this way, application development, build, delivery, and deployment service 210 can implement a document-oriented control plane to expose the customer-configurable parts of a toolchain and expose data about the resources in the service. Application development, build, delivery, and deployment service 210 may have a unified front end control plane layer that handles both read and write requests. In the front end, read requests are forwarded to data set management component and write requests are accomplished through a change control system that can use extensible set of plugins to evaluate the change before being committed as changes to resource documents.

A document-oriented control plane helps application development, build, delivery, and deployment service 210 provide a uniform layer where aggregations, provenance tracking, and comprehensive governance controls can be implemented in a consistent and highly generalized way using resource documents. Resource configurations can be independently defined and updated and data in terms of schemas a document resources, and then the work of aggregating, tracking, or governing these resource documents can be done by a different component with minimal coordination after the schema has been established. Moreover, utilizing document-based control plane techniques may allow resource documents as schemas to provide a natural extension point, because any plugin that produces the required documents or can enact changes using a common schema. For example, given a common set of schemas for source control documents, users could use a built-in source control system or an alternative source control system with minimal impact to the rest of the application functioning.

Given the above performance benefits offered to an application that implements separate relationship management for application data objects used to implement different application features, techniques for separate relationship management for application data objects may increase the capabilities of the application to support additional features. FIG. 1 is a block diagram illustrating separate relationship management for application data objects, according to some embodiments.

For example, application 100 may be a system, service, or stand-alone application that may leverage different application data objects 122 stored in a data store 120 (e.g., a document-based data store). Various different application features, such as the various tools 250 of application development, build, delivery, and deployment service 210 discussed below with regard to FIG. 2, may use application data objects 122 to store data for executing various features, preserving or tracking state of various features, enforcing or implementing various features (e.g., as schemas), among other uses. Application 100 may also implement a separate data store 130 (e.g., a database system or other data store) which may store application data object relationships 132 and data object metadata 134. For example, application data object relationships 132 may be defined as hierarchical associations (e.g., parent-child relationships and/or owner-owned relationships) as well as other associations that are non-hierarchical (e.g., link associations, which associate a word, action, or other information that links to application data objects (e.g., object A is a "RESPONSE" to object B, wherein "RESPONSE" describes the link association and thus the relationship between object A and B).

Data object metadata 134 may also be stored and used to perform various operations. For example, identifiers, such as human readable, unique identifiers sometimes referred to as SLUG identifiers discussed in detail below may be stored as part of data object metadata. In some embodiments, other identifiers, version information, or incremental identifiers, such as incremented SLUG identifiers may be stored as part of application object metadata 134.

Application 100 may implement relationship management 140 and provide an interface 142 to support tracking and updating of application data object relationships 132 as part of various changes to application data objects 122. For example, as different application features submit requests that cause writes to objects 172, a corresponding write to a relationship 162 may be submitted to relationship management 140. Relationship management 140 may then make the appropriate changes by writing 176 to data store 130 to update application data object relationships to correspond to relationship writes. For example, a graph or other data structure may be stored in the second data store that models both the relationships and application data objects. For instance, an application data object may have a corresponding application data object record or entry and one or more relationship attributes or features which identify other application data objects and the type of relationship, such as an application data object with relationship attribute of type parent and value of other application data object (which may be an identifier or other value that can be used to read or locate the record for the other application data object). Each relationship may have its own feature or attribute in the record for the application data object (e.g., one or more parent relationship features corresponding to each parent relationship, an owner relationship feature, a link association feature, etc.)

An acknowledgement 164 (based on acknowledgment 178) may be sent in response to application features 150. Performing writes to relationships may track the relationship information in order to support various relationship-based features that can be supported using application data object relationships (e.g., to share application data objects, to move data application data objects within a hierarchy, to include link associations or add/remove/modify other relationships between application data objects).

Similarly, application features 150 may submit read relationship requests 166 to relationship management 140 which may, in turn obtain the information from application data object relationships 132 (and data object metadata 134 in some embodiments) to return a result 168 based on the result 178. For example, various relationship-based features, such as resolving application data objects using SLUG or other identifiers, obtaining relationship information for a group of application data objects, and other operations as discussed below may be implemented). In some embodiments, a read relationship request 166 may also cause accesses to application data objects 122 in data store 120 by relationship management 140 (not illustrated).

Please note, FIG. 1 is provided as logical illustrations of separate relationship management for application data objects, and is not intended to be limiting as to the physical arrangement, size, or number of components, modules, or devices to implement such features.

The specification first describes an example network-based application development and delivery service that performs separate relationship management for application data objects. Included in the description of the example network-based application development and delivery service are various aspects of the example network-based application, build delivery, and development service. The specification then describes flowcharts of various embodiments of methods for separate relationship management for application data objects. Next, the specification describes an example system that may implement the disclosed techniques. Various examples are provided throughout the specification.

Figure 2:
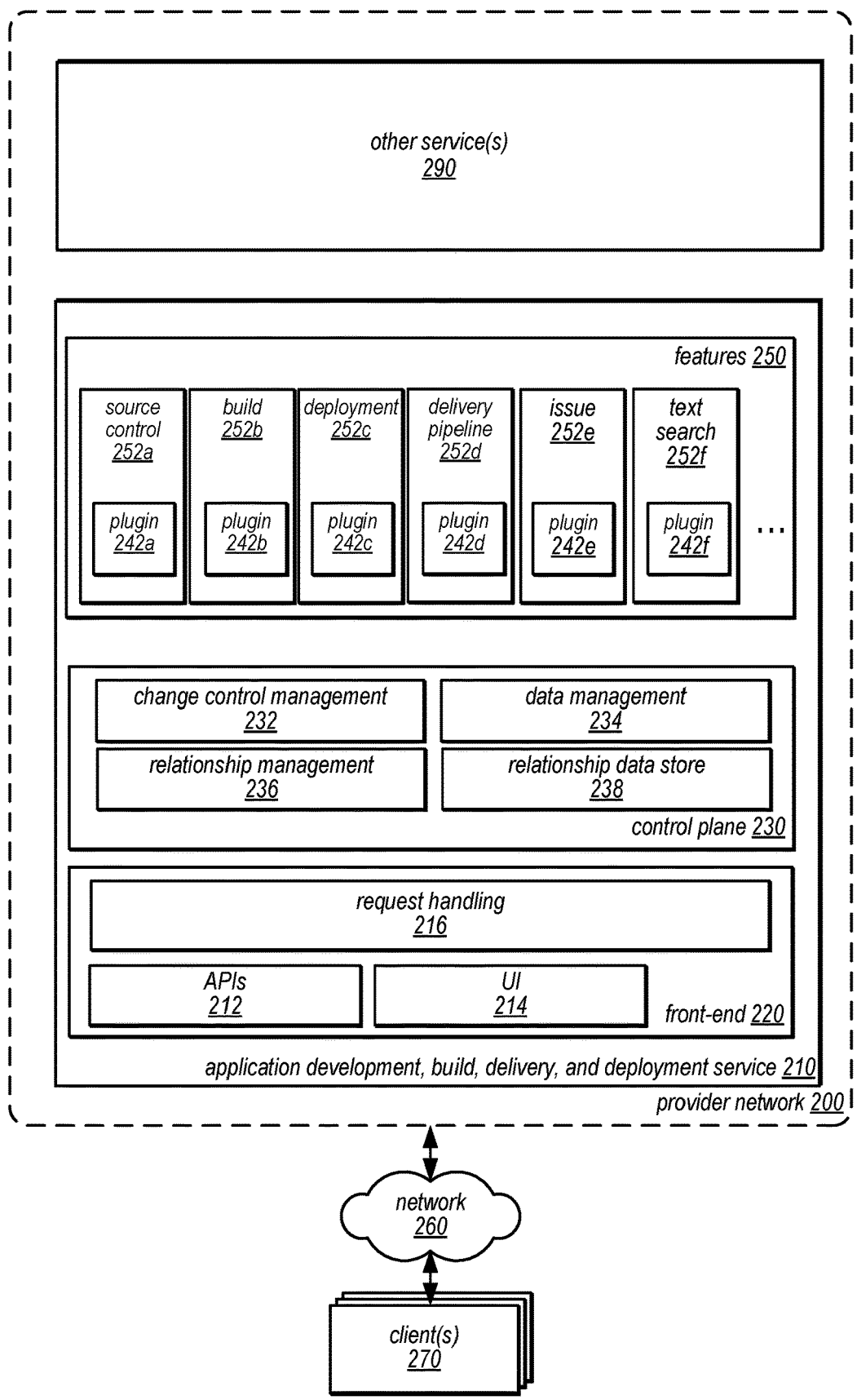
FIG. 2 is a block diagram illustrating a provider network that may implement an application development, build, deployment, and delivery service that implements separate relationship management for application data objects, according to some embodiments.

FIG. 2 is a block diagram illustrating a provider network that may implement an application development, build, deployment, and delivery service that implements separate relationship management for application data objects, according to some embodiments. Provider network 200 may be formed as a number of regions, where a region is a separate geographical area in which the cloud provider clusters data centers. Each region may include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as computation and storage hosts, control plane components as well as external networks, such as network (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients, such as clients 105 in FIG. 1, may be attached to the overlay network so that when a client 105 provides an IP address that they want to send packets to, the IP address is run in virtual space by communicating with a mapping service that knows where the IP overlay addresses are.

Provider network 200 may implement many services, such as other services 290 that provide various types of computing, storage, management, network, or other services. As discussed in detail with regard to FIGS. 2-6, provider network 200 may implement application development, build, delivery, and deployment service 210 that enables developers to plan, write, test, and deliver software as part of a team or engineering organization. Various features of application development, build, delivery, and deployment service 210 may enable more developers to deliver efficiently, safely, and quickly. Application development, build, delivery, and deployment service 210 may offer various tools and capabilities (as well as allowing developers to add, adapt or implement further tools) that developers need to accomplish their tasks. As developers continue to use the tools of application development, build, delivery, and deployment service 210, various features may support the integration of development projects with an developing organization's standards, expanding the usage to more and more teams of the organization. Application development, build, delivery, and deployment service 210 may, in some embodiments, provide a web client that lives outside provider network 200's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features such as change control management 232 and data management 234.

Application development, build, delivery, and deployment service 210 may utilize various tools and other services as building blocks to provide core functionality and a web UI to deliver a unified end-to-end experience. Some features of application development, build, delivery, and deployment service 210 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application development, build, delivery, and deployment service 210 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes" view with near-real-time updates from across the toolchain, or a personalized activity dashboard that spans product areas.

Application development, build, delivery, and deployment service 210 may use a set of tools (e.g., different services) or other features that can act as or utilize respective plugins developed and operated by for the different tools (e.g., source, artifacts, build, test, deploy, issues). The plugins may integrate may integrate with the tools to expose their functionality to end users. The platform services include a web UI 214 framework based on a micro-frontend architecture and a shared API layer. Application development, build, delivery, and deployment service 210 a data management system to facilitate data sharing across tools— and change control management that standardizes the way users perform mutating actions in application development, build, delivery, and deployment service 210.

Application development, build, delivery, and deployment service 210 may implement interface 220 which may include various features for interacting including Application Programming Interfaces (APIs) 212 and a User Interface. For example, APIs 212 may be implemented as a Software Development Kit (SDK) which may include operations to create, read, update, and/or delete various documents which are authored as part of Application development, build, delivery, and deployment service 210. User interface (UI) may be a web, or other graphically based, development environment that allows for various features, including leveraging a micro-front-end framework for packaging and routing client-side applications Text searches, as well as updates that cause index updates may be received or performed through APIs 212 and/or other user interfaces of application development, build, delivery, and deployment service 210.

Control plane 230 may be implemented as part of application development, build, delivery, and deployment service 210 and may include change control management 232, data set management 234, relationship management 236, and relationship data store 238. Data set management 234 may accept data from data providers, manage schemas for the data, manage subscriptions for data consumers and store non-authoritative copies of the data, as discussed in detail below with regard to FIG. 3. Change control management 232 may manage potential changes that can be pre-evaluated, mediate between change approvers, and change performers, and maintain an authoritative reference to the desired state of each resource under its governance, as discussed in detail below with regard to FIG. 4.

As noted earlier, plugins may include plugins 242a, 242b, 242c, 242d and 242e, which may bused to access various development tools, such as features 250, including but not limited to source control 252a, build 252b, deployment 252c, delivery pipeline 252d, issue handling 252e, and text search 252f. Plugins may include web service APIs for change control management 232 and data set management 234 as well as callbacks (similar to webhooks) invoked by those components. Plugins can run on their own infrastructure, and can use whatever technologies wanted to develop plugins; plugins can run on various execution resources in provider network 200 (e.g., various compute or other services). Plugin authors will be able to use generated clients to call change control management 232 and data set management 234 APIs, and for first-party plugins they will be able to use an authorization service to authenticate directly to these systems. At the same time, change control management 232 will pass along the details of the authenticated end user to plugins when changes are requested. Plugin responsibilities may be defined in terms of what document schemas they work with; they may consume some schemas, produce others, and enact changes for the documents they claim responsibility for. Plugins may use registration APIs to indicate which schemas they handle or subscribe to, as discussed below with regard to FIG. 3. This model allows significant flexibility for adding or improving tools, while keeping a consistent experience and facilitating cross-cutting features like governance and data sharing.

Application development, build, delivery, and deployment service 210 may provide a unified end-to-end developer toolchain with governance controls that enable organizations to empower their development teams to deliver software to production with confidence. In order to implement useful governance controls, change control management 232 and data management 234 may allow application development, build, delivery, and deployment service 210 to process information from the end-to-end toolchain in order to present actionable insights to end users as well as make automated decisions about changes according to user-configured policies. As each tool may be completely independent and manages its own data implementing change control management 232 and data management 234 may support combining information from across different tools without disrupting the roadmaps or API designs of the individual tool developers that provide the authoritative data.

Change control management 232 may provide a centralized system to orchestrate policy evaluation and change enactment. Each tool 250 may have its own APIs for enacting changes, with varying styles and capabilities (e.g., put vs. update APIs, declarative vs. imperative models, divergent capabilities for injecting approval requirements, etc.). Change control management 232 may provide a common way to access toolchain data to aid integrations into development, build, delivery, and deployment service 210 and a single place to contribute their own data. Change control management 232 allows for an interface to gain influence over the entire toolchain (subject to customer-defined rules and authorization, in some scenarios).

In some embodiments, clients of change control management 232 and data management 234 (aside from these two systems themselves) may be considered a plugin (e.g., various features 250). A plugin may be a component that is doing some combination of producing data, consuming data, enacting, approving, or requesting changes. For example, an interface, such as UI 214 may be plugin (although illustrated separately in FIG. 2). For example, it produces data about end user activity, consumes data from many other plugins, and requests changes on behalf of the end user. There could also be an aggregator system plugin that uses a tool like Apache Flink to consume data, process it, and produce aggregations to power browse experiences in the UI 214 or to precompute key metrics for display in an integrated development environment (IDE) or use in other plugins. In various embodiments, plugins may not interact directly with one another and can produce data under shared schemas that can be consumed without needing to depend on a specific implementation. For example, there could be a common schema for a document that describes the new commits being added in a pull request; a UI 214 that visualizes this information would not need to produce a separate implementation for each source control tools supported in application development, build, delivery, and deployment service 210. In other scenarios, proprietary schemas for scenarios with differentiated features can also be implemented.

In various embodiments, control plane 230 may be implemented as a document-oriented control plane to expose the user-configurable parts of the toolchain and to expose data about the resources in the system. As noted above, application development, build, delivery, and deployment service 210 may have a unified front end control plane layer that handles both read and write requests. In the front end, read requests may be forwarded to data management 234 (or to indexes populated from data management 234). Write requests may be accomplished through a "requestChange( )" API, where the caller passes the ID and requested content of a document supported by the system. The change can be evaluated by an extensible set of plugins before being committed, and a variety of provider plugins implemented by product area teams can enact the requested change once it is approved.

A document-oriented control plane 230 helps application development, build, delivery, and deployment service 210 provide a uniform layer where aggregations, provenance tracking, and comprehensive governance controls can be implemented in a consistent and highly generalized way. Developers of a tool 250 can define their resource configurations and data in terms of document schemas, and then the work of aggregating, tracking, or governing these documents can be done by a different tool 250 with minimal coordination after the schema has been established. Additionally, application development, build, delivery, and deployment service 210 may be extensible to meet user needs over the long term; the document schemas provide a natural extension point, because any plugin that produces the required documents or can enact changes using a common schema can be used. For example, given a common set of schemas for source control documents, users could use a built-in source control system or a source control system offered by a different organization or provider (e.g., different from provider network 200 and application development, build, delivery, and deployment service 210) with zero or minimal impact to the rest of the experience.

As noted above, application development, build, delivery, and deployment service 210 uses data management 234 to be a central data management system to allow different tools to share data with one another. Data management 234 may implement a publish/subscribe model, where some plugins write new document versions or events and other plugins can consume them. Data management 234 may implement a subscription system that supports subscriptions to a single document, a document type/schema, or to a grouping of documents (e.g., which may be called a partition). Data management 234 may introduce the concept of partitions to allow document updates to be ordered within a document group; for example, this can be leveraged to build a provenance tracking system where consumers of provenance tracking data will be able to depend on referential integrity within a partition because the publisher has ordered documents in an order where (for example) document creation events come before references to the created document. In addition to provenance tracking, the publish/subscribe system may be used to implement near-real-time aggregation and to populate search indexes and other specialized query engines (such as a graph database).

Data management 234 may not need to contain all data in application development, build, delivery, and deployment service 210 to support the various features discussed above. At the same time, it may have enough data that new projects to produce aggregations or that need to trigger off events coming from the toolchain will be able to satisfy most of their needs from existing documents in data management 234. There may be no firm requirements, in some embodiments, about what data is to be maintained in data management 234, as opposed to being made available through pass-through APIs to tools 250 or other data sources (e.g., data stored in other service(s) 290).

As noted above, control plane 230 that implements features like change control management 232 and data management 234 may provide an extensible and adaptable application development, build, delivery, and deployment service 210. For example, if it were desirable to add a new feature, such as new tool 250 to application development, build, delivery, and deployment service 210, such as a "track changes" feature that allows users to find out where a change is in their continuous delivery (CD) pipeline with integrated context from across the toolchain, the user experience may be designed first. This user experience may might include the presentation of some information and a navigation structure. Then, the API contract between the client and application development, build, delivery, and deployment service 210 (e.g., in a user interface implemented on a client 270, this could be the API that JavaScript would use to get data and push notifications). In the case of track changes, the API would return data with a given schema designed to support the needs of the user experience. This schema could be registered in data management 234.

Next, development of the track changes feature can be made based on example data pushed to data management 234 following this schema. In parallel, an aggregation process can be designed. For track changes, there may need to be some new data produced by the existing feature plugins (e.g. populating a missing identifier) as well as a new aggregation pipeline to take all the data from feature plugins and join them together into a document in the form required by the user experience. These changes can be made in parallel to each feature plugin, and the aggregation can be done as a new analytics application in an analytics service plugin. For each plugin, the process of integrating with data management 214 may be the same: first, the plugin can register a new schema version describing the additional data that would be sent. Then, the plugin can consume new versions of schemas from their dependencies. Finally, a new schema version can be produced—in the case of a backwards-incompatible update, this might be a fork of the code for the new tool so that both versions are produced. Data management 234 can ensure that consumers are able to quickly get updates from producers so that the aggregated view can be a near-real-time representation of what is happening in the underlying tools. Finally, the user interface can migrate from its test data set to the real data coming from the aggregation pipeline.

In another example, an update to an existing feature can be made using the extensibility and adaptability provided by control plane 230. For example, if minor update (from a customer experience perspective) were to be made to an existing feature plugin, then new data may need to be provided from the plugin to the client. The process of working with data management 234 can be identical to what goes on for a new feature; working backwards from user experience, any data aggregation layers that are needed may be designed, and new schema versions for the feature plugin may be added. However, in some cases generalizable schema traits can be used further shorten the development process for the update. For example, a new text field input is added to a project, traits in the schema could allow each layer (the aggregation as well as the client plugins) to add user interface treatments to most attributes of the project generically. In some cases, the feature plugin may be able to add a backwards-compatible update with an appropriately decorated schema and have the new information show up in the UI 214 without any work on other tools 250.

Data producers write data to data set management 234, either in the form of an event stream or a set of documents that the producers update over time, in some embodiments. Data producers advertise schemas to which the data they publish is expected (and enforced) to conform. Data consumers can subscribe to events or document updates and retrieve data from data management 234, relying upon a feature of data set management 234 that will return data that's valid according to the advertised schema. Plugins can be both producers and consumers, but in some scenarios not for the same data. For example, text search 252*f* may be a subscriber to various documents events that add, delete, or modify documents in order to make corresponding updates to inverted indexes.

Figure 3:
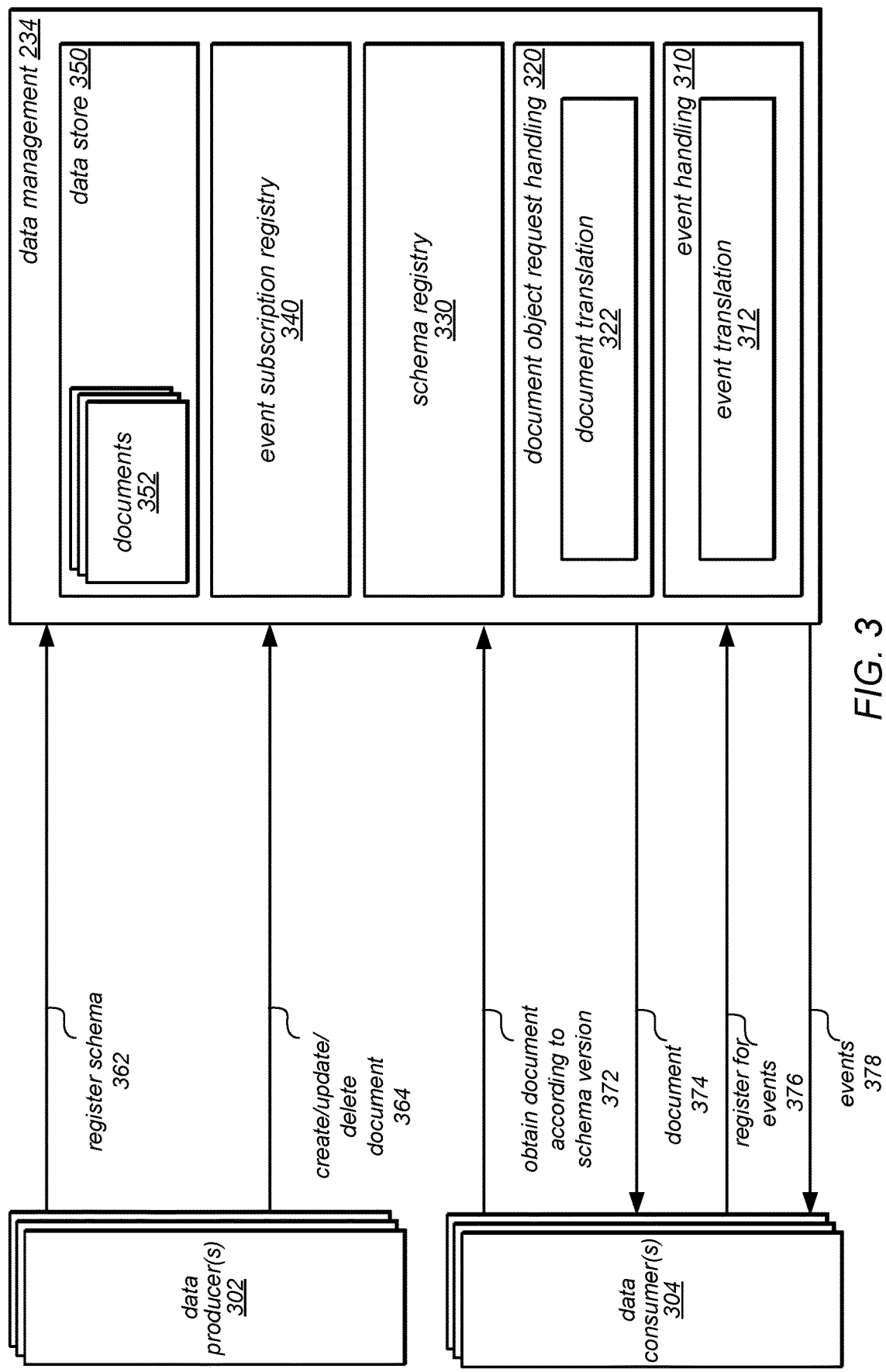
FIG. 3 is a block diagram illustrating data set management, according to some embodiments.

FIG. 3 is a block diagram illustrating an example data management system for the application development, build, deployment, and delivery service, according to some embodiments. Data management 234 may implement different types of request handling. Event handling 310 may perform event translation as part of handling different events. Document object request handling 320 may perform document translation 322 as part of handling different document object requests.

For example, document object request handling 320 may receive document update requests, such as update request (e.g., to create, modify, or delete a document object). Document object request handling 320 may send a request to get applicable schema version(s) from schema registry 330. Schema registry 330 may identify the applicable schema versions (e.g., from mapping information) or may identify them from identifiers in the request. Schema registry may return the schema version(s) to document object request handling. Document object request handling 320 may use the schemas to determine the update fails to satisfy the schema(s), such as failing to satisfy a current version of the schema. If so, then a rejection of the update as invalid may be sent. Document object request handling 320 may then send a request to data store 350 to update the document according to the request. Document object request handling 320 may also send a notification of an update document event to event handling 310.

Similar techniques to those depicted with regard to document update can be performed to create a new document. For example, a create document request can be received at document object request handling 320, which include information, such as a file (or location thereof), or other information used to create the document. Again, document object request handling 320 may get applicable schema version(s) 320 so that document object request handling 320 can determine which schema version to apply to create the document. For example, the document may one of many documents that are created according to the same schema. Which schema version is applied may correspond to which plugin (e.g., which tool or other feature) submitted the document creation request. Mapping information may, for example, be used to determine which schema version is applicable to which requestor. In some embodiments, the request itself may specify the schema version. Document object request handling 320 may then store the document to data store 350. An event may be triggered or sent to event handling 310.

Schema registry 330 may provide storage for different schema versions, translation instructions and other schema information. A request to register a schema 362 may be received. For example, an interface of a data management system, like data management system 234, may support registration requests (e.g., via API, graphical user interface, command line interface, and so on), in order to provide a new version of a schema (e.g., specified as a JSON or other script, programming code, or language) with an associated data object (e.g., a document or event stream). In some embodiments, the schema may include or link to instructions (e.g., scripts, programming code, or language) for translating between the version of the schema being registered and one or more prior versions of the schema (e.g., describing what data field was added, changed, removed, etc.).

The registration request may be rejected, in some embodiments, if the request or updated schema fails a validation technique, such as analysis indicating that the version of the schema fails to conform to various stylistic or other constraints on schemas (e.g., using invalid data types). A response indicating that the registered version of the schema is invalid may be returned.

The version of the schema may be added to a registry 330 for schemas for data objects, in some embodiments. For example, a database or other data storage system may store a schema as a document, file, or other object. A link, mapping, or other association may be updated to identify which data object(s) (e.g., event stream or document) the schema is applicable to (e.g., a version number, a schema identifier and data object identifiers).

Event subscription registry 340 may support storage for data consumers to register for events. Data store 350 may store data for data objects, such as documents 352 and event streams (not illustrated).

Data producers may submit various requests, including registering a schema 362, creating, updating, or deleting a document, as indicated at 364, creating an event stream, or submitting events. For example, data consumers may submit various requests and receive various responses, including requests to obtain a document according to a schema version, as indicated at 372, receive the document 374, register for events, as indicated at 376, and receive events, as indicated at 378. For example, document object request handling 320 may handle requests to obtain documents. Document object request handling 320 may get the applicable schema versions from schema registry 330. Document object request handling 320 may also get the document from data store 350. If translation should be performed, then translation instructions may be used and the document sent to the data consumer 304.

Similarly, in another example, events may be received either from their submission to data management 234 as part of an event stream or as an event related to a document update or creation (as noted above). Event handling 310 may send a request to get applicable schema(s) for the event to schema registry 330. Schema registry may identify the applicable schemas (e.g., based on mapping information) or may return those schema(s) identified in the request (e.g., by version and schema identifier). The schemas may be returned.

Event handling 310 may use the schemas to evaluate the validity of the event. If the event does not satisfy the schema(s), then it may be rejected, as indicated at 607. If valid, event handling 310 may send a request to event subscription registry to get 609 subscribers for the event (e.g., subscribers to an event stream or document). Event subscription registry 340 may return the subscribers. Event handling 310 may determine, based on the subscribers, whether translation should be performed (e.g., does an event subscription have a schema version identifier matching the event, or an earlier schema). If translation should not be performed, then the event is sent. If translation should be performed, then translation may be performed using translation instructions between schemas and the translated event sent.

Figure 4:
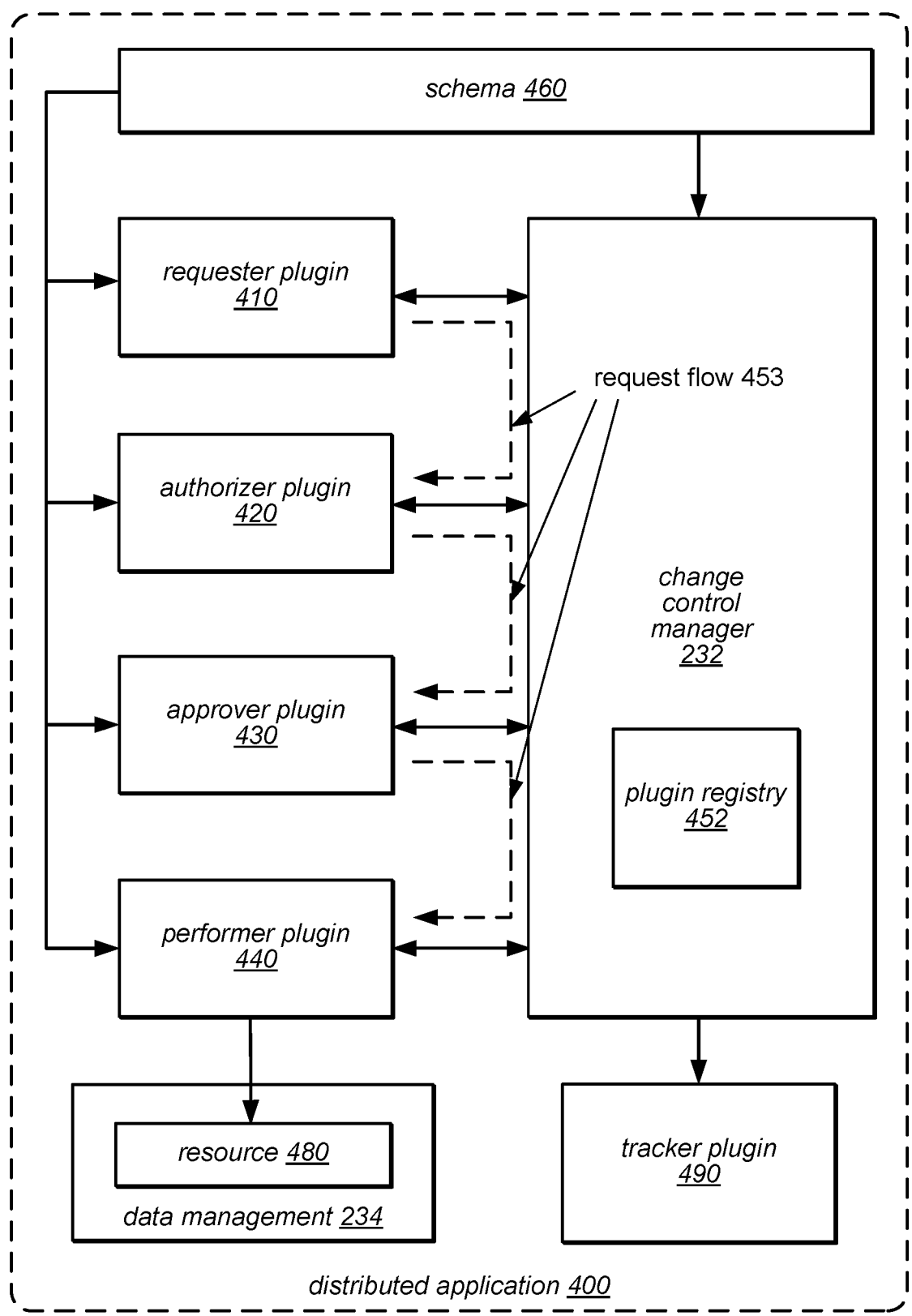
FIG. 4 is a block diagram illustrating change control management, according to some embodiments.

FIG. 4 is a block diagram illustrating extensible change control management, according to some embodiments. Distributed application 400, such as an application that utilizes various plugin components to integrate, support, and extend the capabilities of the distributed application 400, may include a change control manager 232 which may implement changes to a resource 480 stored in data management 234 using various plugins 410, 420, 430 and 440, in some embodiments, identified in plugin registry 452. Plugin registry 452 may be a registry for a single resource (or organized to group registered plugins by resource) in a data structure (e.g., table, index, etc.). The resource 480 may be of a particular resource type, with the resource type having an associated schema 460. Various change operations for the resource 480 may be encoded using the schema 460, and the various plugins 410, 420, 430 and 440 as well as the change control manager 232 may access the schema 160 during communication of these operations.

A requester plugin 410 may submit requests for changes to the resource to change control manager 232. These requests for changes may follow a typical request flow 453. These requesters may, in some embodiments, provide various user interfaces (UIs) or Application Programming Interfaces (APIs) or other programmatic interfaces to allow users to submit change requests to the change control manager. In other embodiments, a requester plugin may perform other plugin roles for the resource of for other resources and may submit change requests as part of fulfilling other plugin roles. These examples, however, are not intended to be limiting, and any number of requester plugin implementations may be envisioned.

An authorizer plugin 420 may authorize or reject change requests submitted to the change control manager 232 by requester plugins. An approver plugin 430 may approve or reject change requests submitted to the change control manager 232 by requester plugins. A given resource may have any number of registered approver plugins in plugin registry 452, in various embodiments.

A performer plugin 440 may perform approved change requests submitted to the change control manager 232 by requester plugins. In some embodiments, a plugin may implement more than one plugin function for a resource or the same or different plugin functions for different resources. For example, in some embodiments, a plugin may implement both an approver plugin function as well as a performer plugin function for a resource, as discussed below. It should be understood, however, that some combinations of plugin functions may not be allowed, for example, a plugin implementing both a requester function and an approver function for the same resource. These examples, however, are not intended to be limiting and any number of plugin implementations may be imagined.

In addition, a tracking plugin 490 may receiving notifications of various events associated with the resource 480. A change performer plugin component 440 may advertise possible changes and reference the projected consequences to a resource 480 stored within data management 234.

For example, a performer plugin 430 may advertise a change to merge a pull request with the consequence that the tip of the destination branch will change. Change approver plugin 430 may be required to record approval in change control manager 232 before a change can proceed. For example, if it is desirable to use an advisory time window plugin, that plugin would have to approve changes to deployed environments before they are enacted—a time window plugin would reject changes that take place during an advisory period. Change approver plugins 430 can pre-approve a change where applicable. For example, when evaluating whether a user can merge a pull request, in most cases it is not necessary to wait for a user to actually request the merge to determine if it is allowed. Change requester plugin 410 may start the process of enacting a change.

These requester plugins could be client plugins that provide user interfaces (UIs) that make these requests on behalf of end users but they could also be feature plugins. For example, a delivery pipeline plugin (e.g., plugin 242d as shown below in FIG. 2) could be a change requester 410 and initiate changes to each target resource according to its orchestration rules instead of directly performing these changes itself. Finally, change performers 440 complete the process by enacting approved changes and recording the results in change control manager 232 and data management 234. Plugins may perform combinations of these roles, but it may be rare, in some scenarios, for a plugin to perform multiple roles for the same type of change—for example, it is not expected that a plugin will be an approver for its own changes. As discussed in detail below, change control management 232 may initiate updates to relationship management 236 corresponding to the requested changes.

Figure 5A:
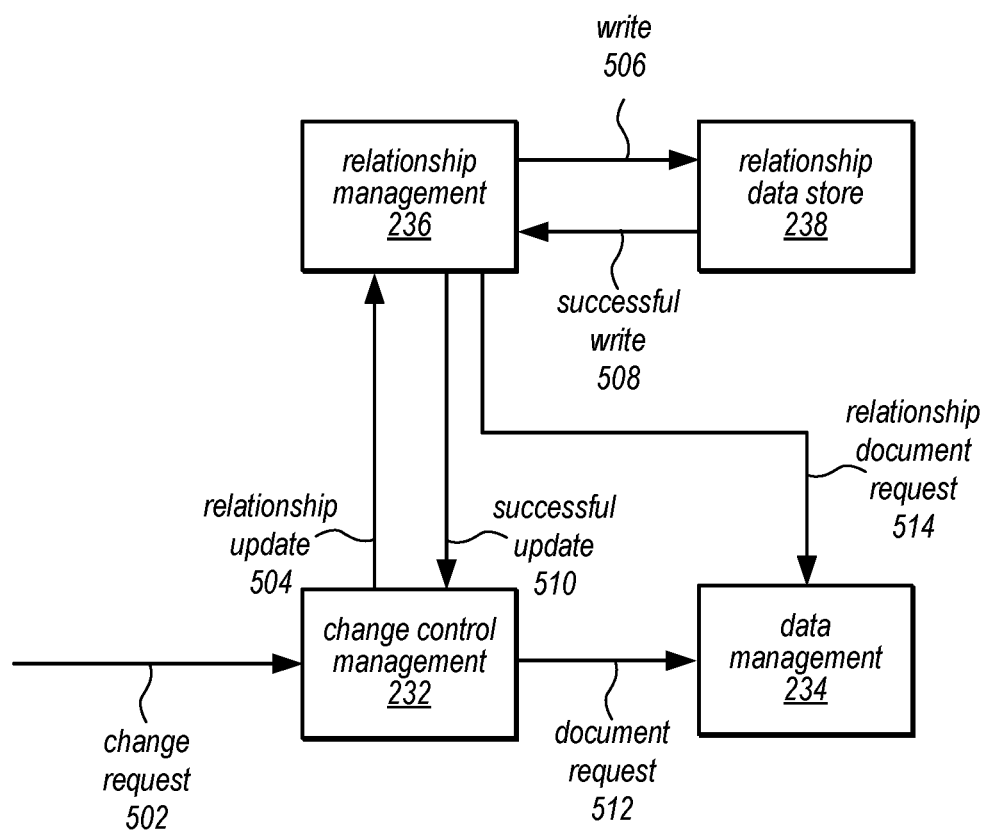
FIGS. 5A-5B are block diagrams illustrating different integrations of relationship management in application development, build, deployment, and delivery service, according to some embodiments.

FIG. 5A is a logical block diagram illustrating indirect interactions with relationship management, according to some embodiments. For example, change control management 232 may accept various requests, as discussed above with regard to FIG. 4, and utilize relationship management 236 to track the changes to relationships caused by the request. For example, a change request 502 (e.g., a request to create, update, modify or delete a resource document) may be received at change control management 232. As part of performing the request, change control management 232 may submit a relationship update 504 to relationship management 236 which may perform a write 506 to relationship data store 238 to affect the relationship update and indicate success of the update 510 after receiving a successful write indication 508. Although not illustrated, in some embodiments, change control management 232 may first submit a relationship request to relationship management 236 to create the document with a reservation for a relationship, and then after completing the document request 512 to create the document in data management 234, send another request to claim the relationship (to relationship management 236) before performing the relationship update 504. In this way, race conditions related to relationships between documents can be avoided.

Change control management may then perform a document request 512 for the resource document itself (e.g., to create, delete, modify, etc.) at data management 234. As indicated at 514, relationship management 236 may also send a relationship document request to update relationship changes in data management 234 (e.g., which may be used to generate a materialized view of resource documents as discussed below with regard to FIG. 10).

Figure 5B:
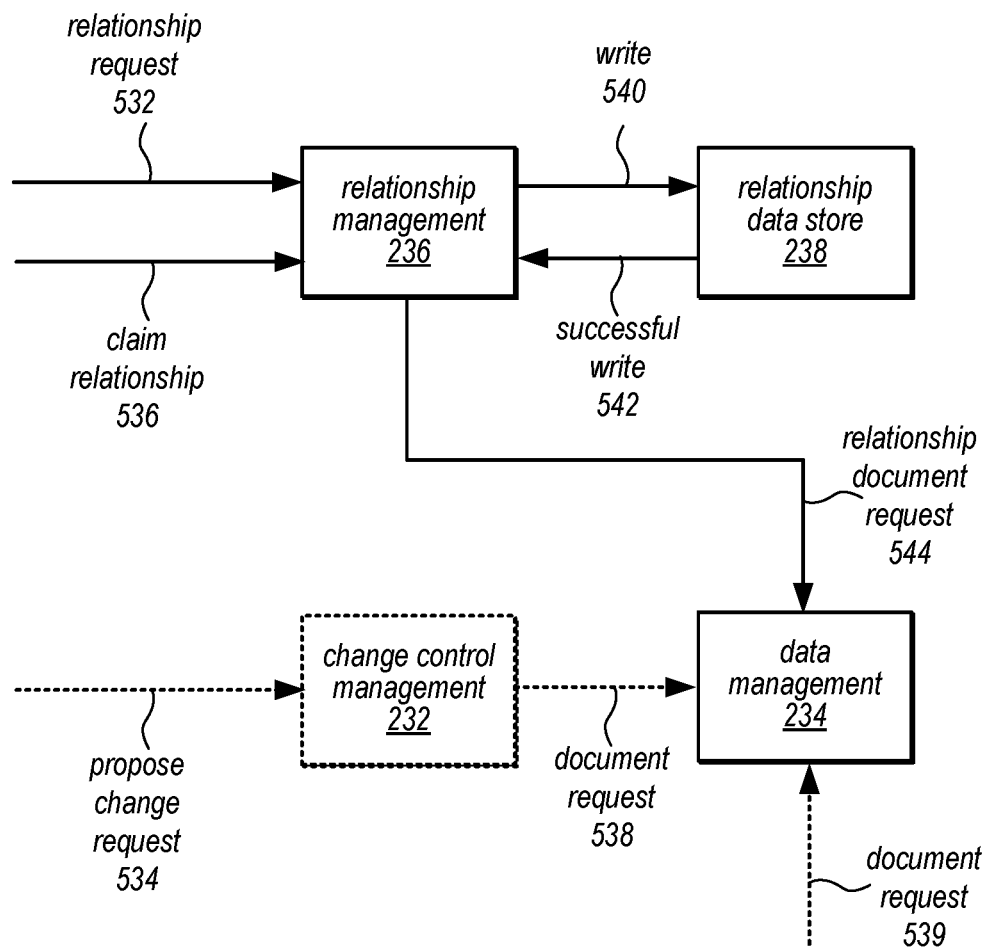

FIG. 5B is a logical block diagram illustrating direct interactions with relationship management, according to some embodiments. In some scenarios, components of application development, build, delivery, and deployment service 210 may interact directly with relationship management 236 to perform various operations. For example, a relationship request 532 (e.g., to create a resource document) may be submitted to reserve a relationship to be created when a document is created. Write 540 may be performed to add or otherwise correspond to the submitted relationship request (e.g., to create the new resource document). Relationship data store 238 may indicate a successful write 542 to relationship management 236.

As indicated at 534, this new resource document may also be proposed as a change request 534 to change control management 232. Change control management 232 may then submit a document request 538 (e.g., to put a new document) to data management 534. Alternatively, document requests 539 may be directly submitted to data management 234, in some scenarios (after relationship request is submitted). A claim relationship request 536 may be submitted to relationship management 236 to finalize completion of the relationship and cause a relationship document request 544 to be performed to update a relationship document describing the relationship change in data management 234 (e.g., which may be used to generate a materialized view of resource documents as discussed below with regard to FIG. 10). Reserving through relationship request 532 and then claiming the relationship as indicated at 536, in this way may avoid race conditions related to relationships between documents.

Figure 6:
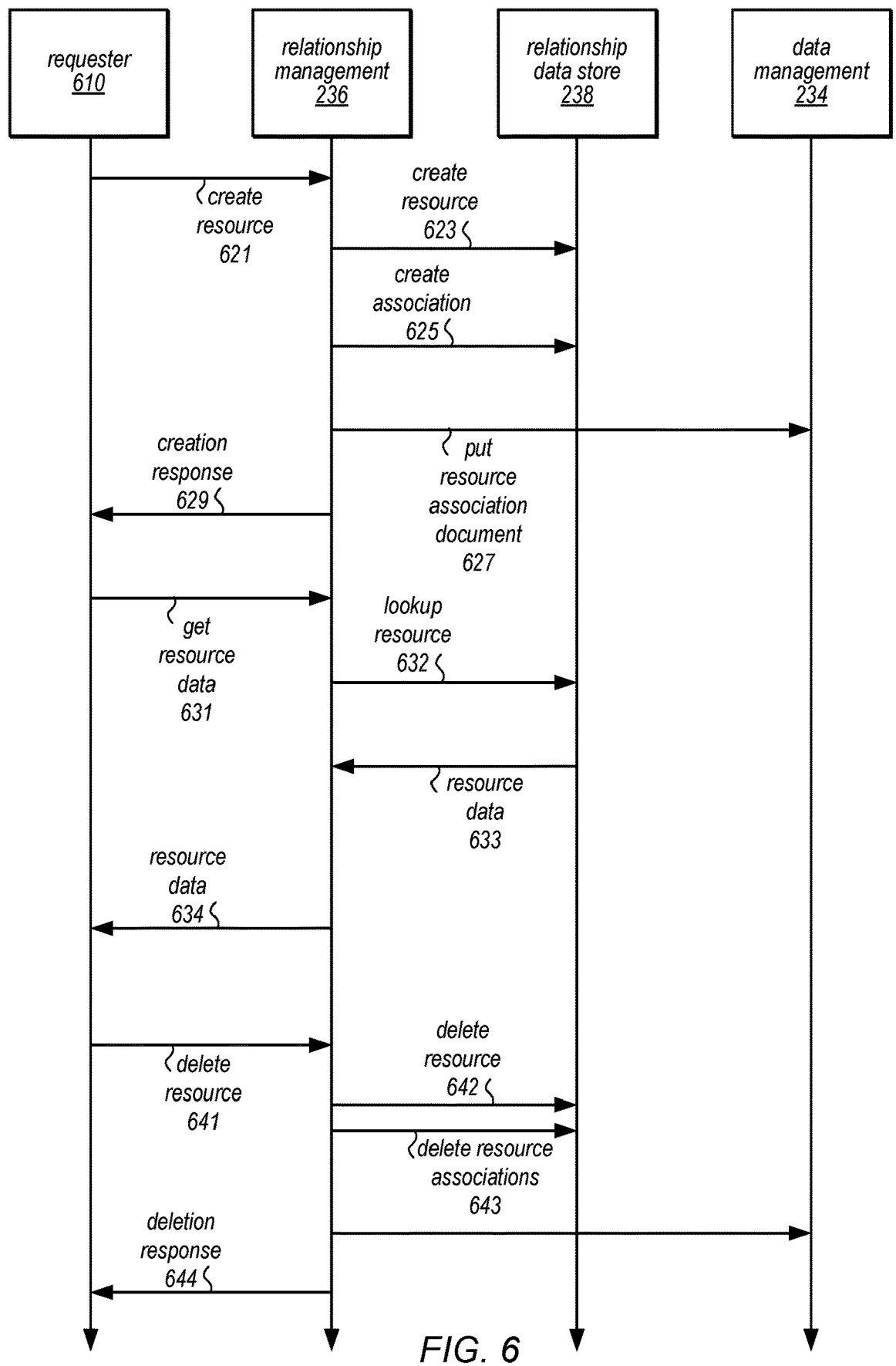
FIG. 6 is a sequence diagram illustrating interactions to generate a materialized view of associated resource documents, according to some embodiments.

FIG. 6 is a sequence diagram illustrating interactions to access associations of resource documents, according to some embodiments. As discussed above with regard to FIGS. 5A and 5B, different components of application development, build, delivery, and deployment service 210 may submit requests to relationship management 236, such as change control 232 or other components such as tools 250 (e.g., via plugins). Requester 610 can submit a request to create a resource 621 to relationship management 236. Although not illustrated, relationship management 236 may perform various operations to validate the create resource request (e.g., determine identity/authorization to perform the request, verify correct syntax or other features specified in the request, verify existence or correctness of parameters in the request (e.g., data objects), among other validation operations). If the request is invalid, the request may be denied.

Relationship management 236 may both create the resource, as indicated at 623, and create the association for the resource, as indicated at 625 (e.g., by updating or inserting records and/or attributes in relationship data store 238). As indicated at 627, relationship management 236 may put or otherwise update a resource association document describing the creation, as indicated at 627, to data management 234. Relationship management 236 may acknowledge successful creation in creation response 629 to requester 610.

A lookup of a resource may be performed, as indicated by get resource data 631 sent to relationship management 236 (e.g., associations and other metadata). Again, although not illustrated, relationship management 236 may perform various operations to validate the get resource data request (e.g., determine identity/authorization to perform the request, verify correct syntax or other features specified in the request, verify existence or correctness of parameters in the request (e.g., data objects), among other validation operations). If the request is invalid, the request may be denied. Relationship management 236 may perform a resource lookup 632 in relationship data store 238 and return 634 the associations and other resource data 633 obtained from relationship data store 238.

A resource may be deleted, which may include deleting the resource documents associations. As indicated at delete resource request 641 may be submitted to relationship management 236.). Again, although not illustrated, relationship management 236 may perform various operations to validate the delete resource request (e.g., determine identity/authorization to perform the request, verify correct syntax or other features specified in the request, verify existence or correctness of parameters in the request (e.g., data objects), among other validation operations). If the request is invalid, the request may be denied. Relationship management 236 may delete the resource 642 and delete the associations, as indicated at 643, stored in the associated resource documents (e.g., as identified in the deleted resource). Relationship management 236 may then acknowledge completion of the deletion, as indicated at 644.

In some embodiments, a recursive delete may be implemented. For example, this feature allows relationship management 236 to recursively delete resources based on resource association information. Delete requests may be sent to change control management 232. Change control management 232 may then invokes relationship management 236 which "locks" the resource from further modification, path resolution, and linking and then asynchronously performs various operations to cleanup other resources in addition to the deleted resource. For instance, these asynchronous operations may traverse through the relationships between a specified resource and child resources and then invoke the same recursive delete process for the child. This can happen recursively until an group of related resources (e.g., an entire resource tree) has been discovered and removed.

Figure 7:
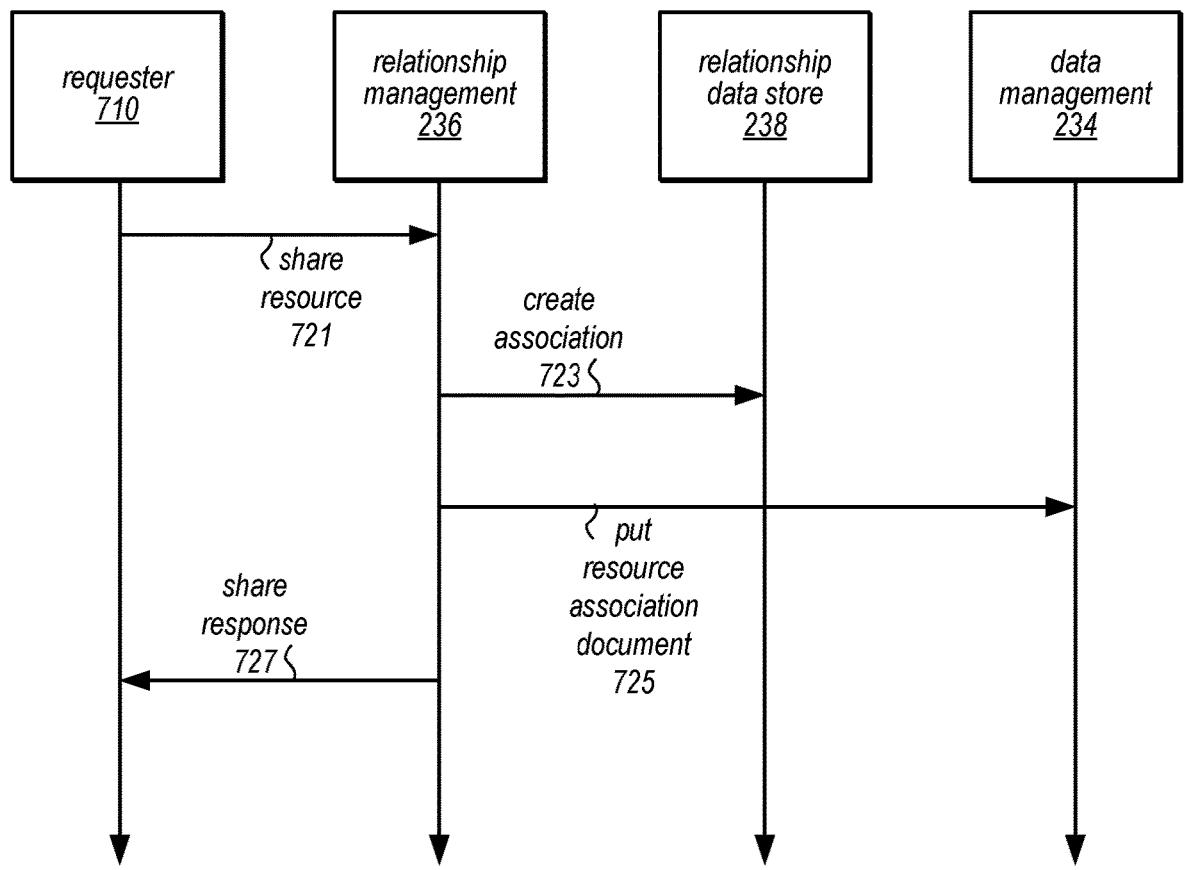
FIG. 7 is a sequence diagram illustrating interactions to share a resource document with another resource document, according to some embodiments.

FIG. 7 is a sequence diagram illustrating interactions to share a resource document with another resource document, according to some embodiments. For example, by sharing a resource document to have multiple parent resource documents, a single code repository could, for example, be shared across multiple projects. Share requests may include requests to create the new shared association (e.g., create a new parent for a resource document) or to remove a shared association (e.g., to remove an added parent from a resource document).

Requester 710, which may be similar to requesters discussed above, may send a request to share a resource, as indicated at 721, to relationship management 236. Although not illustrated, relationship management 236 may perform various operations to validate the share resource request (e.g., determine identity/authorization to perform the request, verify correct syntax or other features specified in the request, verify existence or correctness of parameters in the request (e.g., data objects), among other validation operations). If the request is invalid, the request may be denied. Relationship management 236 may create the association, as indicated at 723 in relationship data store 238 (e.g., by inserting or adding a new attribute or feature into records for the resource document being shared and the resource document being targeted to share the resource document (e.g., as an additional parent resource document). As indicated at 725, relationship management 236 may put or otherwise update the resource association document at data management 234. Relationship data management 236 may send a response indicating completion of the share request, as indicated at 727.

Figure 8:
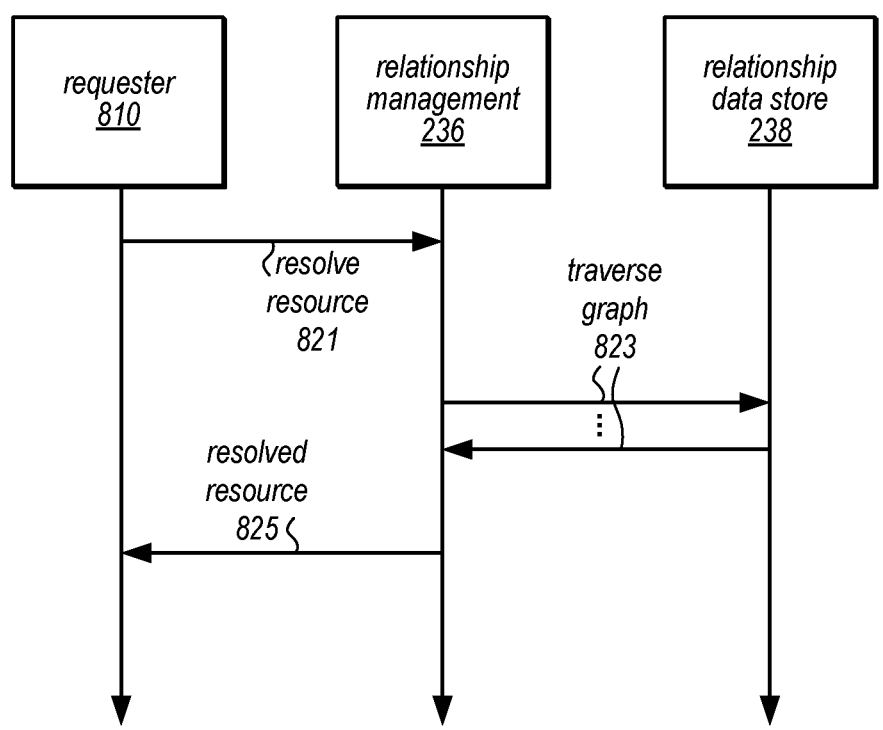
FIG. 8 is a sequence diagram illustrating interactions to resolve a resource using a relationship data store, according to some embodiments.

FIG. 8 is a sequence diagram illustrating interactions to resolve a resource using a relationship data store, according to some embodiments. For example, different components of application development, build, deploy, and delivery service 210 may wish to utilize uniform resource identifiers or other paths (e.g., "/organization/foo-org/projects/foo-project/repositories/demo-repo-1"). A resolve resource operation may be supported using the tracked relationships between resource documents (e.g., to return an identifier for "demo-rep-1" which may be different than a same named document in another project). Instead of implementing a system to access each resource document, the tracked associations in the relationship data store can be quickly accessed to determine the identifier (e.g., a system identifier) of the desired resource document. Another example of a resolution request may be a query or other search that includes multiple features as predicates, such as query for a resource document with "organizationName=foo-org" AND "projectName=foo-proj" AND "name=CODESTAR-345".

Requester 810 may be similar to requesters discussed above. Requester 810 may submit a request to resolve a resource, as indicated at 821 to relationship management 236, in some embodiments. Although not illustrated, relationship management 236 may perform various operations to validate the resolve resource request (e.g., determine identity/authorization to perform the request, verify correct syntax or other features specified in the request, verify existence or correctness of parameters in the request (e.g., data objects), among other validation operations). If the request is invalid, the request may be denied. Relationship management 236 may traverse 823 the graph or other associations in relationship data store 238 in order to determine a result for the resolve request. For example, a first resource document may be associated with a second resource document. Relationship management 236 may then access the second resource document and identify an association with a third resource document, and so on. Relationship management 236 may then return the resolved resource 825.

Figure 9:
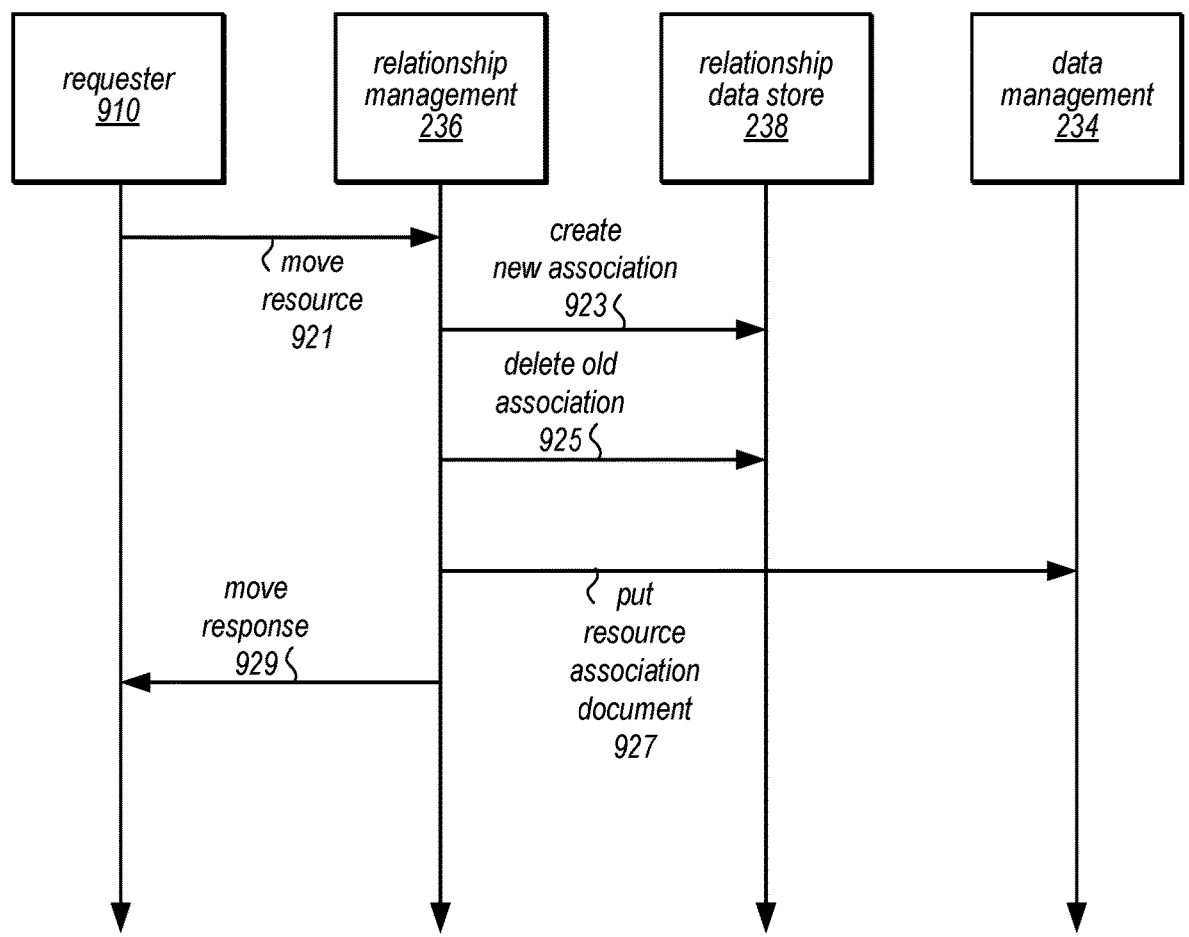
FIG. 9 is a sequence diagram illustrating interactions to move an association of a resource document, according to some embodiments.

FIG. 9 is a sequence diagram illustrating interactions to move an association of a resource document, according to some embodiments. For example, a move request can be to change the owner relationship or parent relationship for a given resource document from a current parent/owner resource document to a new parent/owner resource document. Requester 910 may be similar to requesters discussed above. A request to move a resource, as indicated at 921, may be sent to relationship management 236. Although not illustrated, relationship management 236 may perform various operations to validate the move resource request (e.g., determine identity/authorization to perform the request, verify correct syntax or other features specified in the request, verify existence or correctness of parameters in the request (e.g., data objects), among other validation operations). If the request is invalid, the request may be denied.

Relationship management 236 may create a new association 923 in relationship data store 238 (e.g., with the targeted resource document) and delete the old association, as indicated 925. In some embodiments, creation request 923 and deletion request 925 may be performed as a transaction, so that both succeed or fail (e.g., using an atomic operation). As indicated at 927, relationship management 326 may put or otherwise update a resource association document 926 at data management 234 to reflect the change in association. Relationship data management 236 may send a move response 929, indicating completion of the move, in some embodiments.

Figure 10:
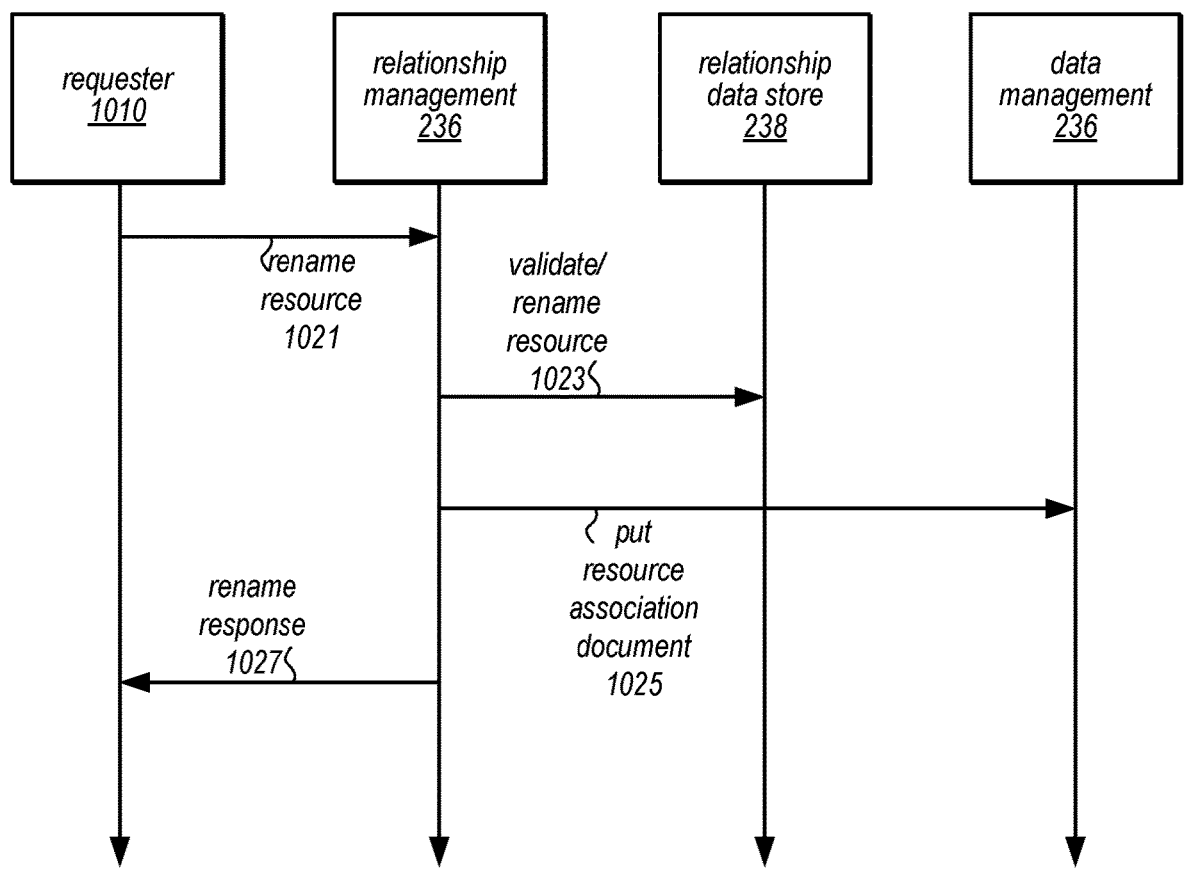
FIG. 10 is a sequence diagram illustrating interactions to rename a resource document, according to some embodiments.

As discussed above with regard to FIG. 1, relationship management may include various metadata describing application data objects, such as resource data objects. Relationship management may support various requests or interface commands to interact with, including modifying, such metadata. FIG. 10 is a sequence diagram illustrating interactions to rename a resource document, according to some embodiments.

Identifiers for resource data object may include SLUG identifiers. A SLUG identifier may be a human-readable identifier used to identify a resource, (e.g., instead of unique number and/or text-string sequence which may be unique but not indicative of the object identified by the identifier). In some embodiments, a SLUG identifier for a resource document may unique within a scope of a parent resource document (e.g., unique between all those resource documents that are children of the parent resource document). In some embodiments, a validation check may be performed as part of renaming a SLUG for a resource document in accordance with the scope of a parent resource document, as discussed below. For example, a rename validation may fail if a new SLUG identifier matches an existing SLUG identifier of another child resource document for the same parent resource document.

Requester 1010, similar to other requesters discussed above, may submit a request to rename a resource 1021 to relationship management 236. Relationship management 236 may validate the new name and, if valid, rename the resource by updating the relationship data store 238, as indicated at 1023. The change may also be propagated by putting or otherwise updating a resource association document, as indicated at 1025, at data management 234. A rename response may then be returned, as indicated at 1027.

In some embodiments, SLUG identifiers may be incremented according to a request (not illustrated). For example, relationship management 236 may increment (e.g., by ones or other value) a number appended to a SLUG (e.g., CODESTAR-1, then CODESTAR-2, and so on). This SLUG identifier update may be performed by incrementing the attribute for the SLUG identifier in relationship data store 238. In some embodiments, old SLUG identifiers (e.g., after a rename operation) may be retained, but identified with a marker (e.g., a tombstone marker) in order to preserve the operation of some application features that rely upon the older SLUG identifier.

Figure 11:
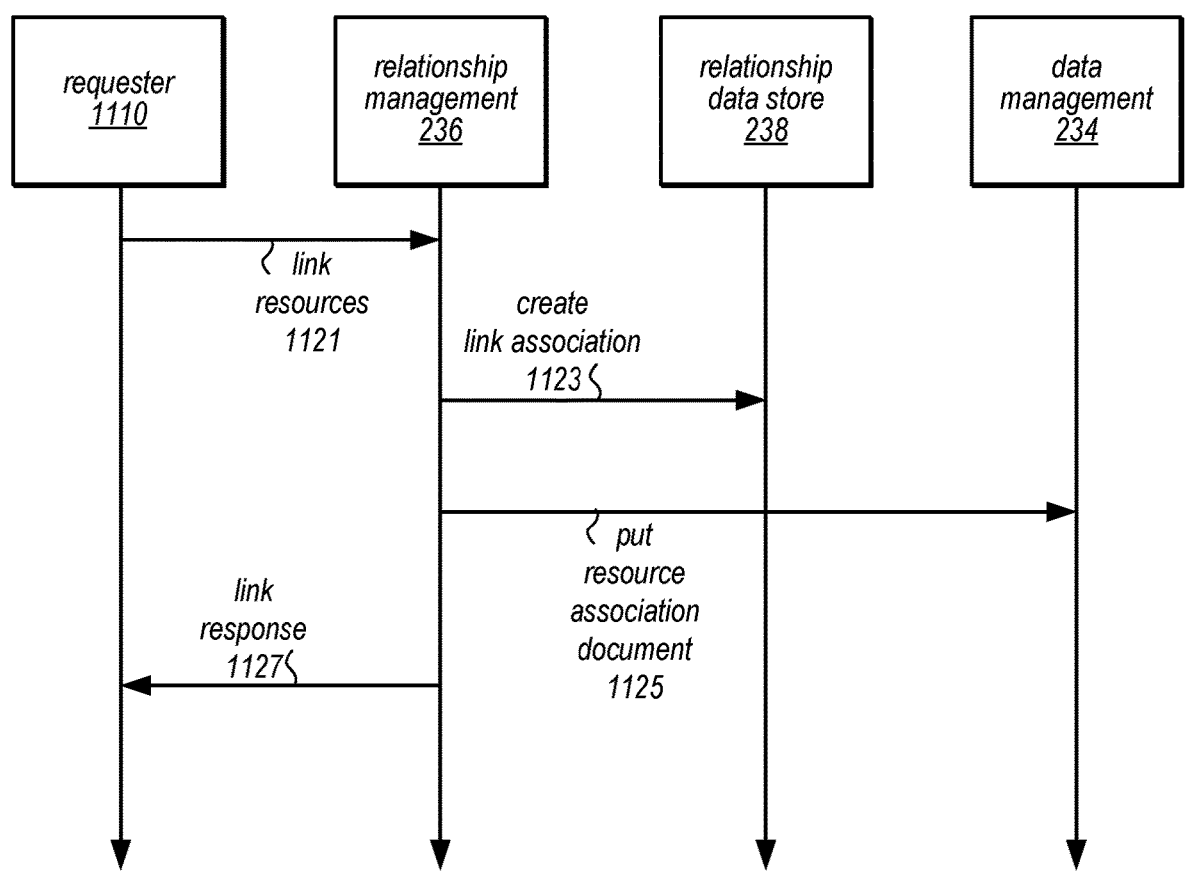
FIG. 11 is a sequence diagram illustrating interactions to create a link association between resource documents, according to some embodiments.

FIG. 11 is a sequence diagram illustrating interactions to create a link association between resource documents, according to some embodiments. For example, in addition to hierarchical relationships, such as parent-child relationships and/or owner/owned relationships, other associations between resource documents may be supported. For example, an issue tracking tool as discussed above with regard to FIG. 2 may want to indicate that an issue is resolved by some commit action that changed code in a code repository. Such an association may different as it does not affect the hierarchical organization of resource documents, such as by not blocking deletions, allowing for multiple link associations (e.g., with different verbs, such as "RESOLVED_BY").

Requester 1110, similar to other requesters discussed above, may send a request to link resources 1121 to relationship management 236. Although not illustrated, relationship management 236 may perform various operations to validate the link resources request (e.g., determine identity/ authorization to perform the request, verify correct syntax or other features specified in the request, verify existence or correctness of parameters in the request (e.g., data objects), among other validation operations). If the request is invalid, the request may be denied.

Relationship management 234 may create a link association in relationship data store 238 and then put or otherwise update a resource association document, as indicated at 1125, indicating the link association to data management 234. For example, an additional association or other relationship attribute may be added to a resource document record, identify the relationship as a link association of type X (e.g., a verb as discussed in the examples above) and the identity of the other resource document linked. Relationship management 236 may then return a response indicating that the link association has completed, as indicated at 1127.

Figure 12:
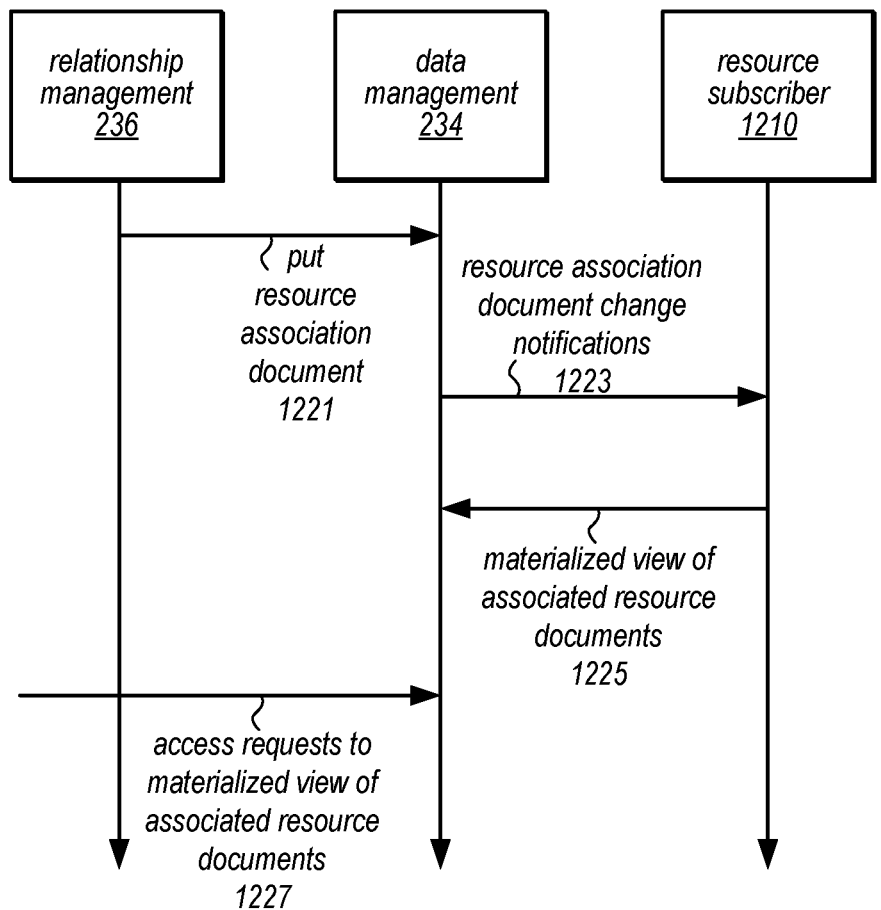
FIG. 12 is a sequence diagram illustrating interactions to generate a materialized view of associated resource documents, according to some embodiments.

FIG. 12 is a sequence diagram illustrating interactions to generate a materialized view of associated resource documents, according to some embodiments. As noted above in FIGS. 5A-11, in some circumstances, relationship management 236 may create, update, or otherwise put, as indicated 1221, a resource association document to data management 234, which may describe the relationship changes between resource documents that have occurred as a result of various requests. Data management 234, as noted above, may implement a subscription feature, which may allow subscribing component to receive a notice 1223 of updates or changes to resource association documents. For example, resource subscriber 1210 may be a tool that operates on a set of related resource association documents (e.g., resource association documents in a common project).

Resource subscriber 1210 may use the resource association document changes to generate and/or update a materialized view (e.g., a table or other data structure) that indicates the group of associated resource documents, as indicated 1225 (which may be stored as part of data management 234). In this way, various features to list associated resources, such as all code repositories associated with a given project or account can be quickly determined without having to scan or query resource documents in data management 234 directly. Instead, the associated resource documents can be materialized according to relationship type (e.g., hierarchical (parent or owner) or link) and kept up-to-date as the subscription of changes to resource association documents may in turn allow resource subscriber to update the materialized views as changes are received. Moreover, such materialized views can then be used to support filtering, sorting, and other operations that retrieve additional information from the source resource documents identified by the materialized view (e.g., obtain a feature, attribute, or other data from a resource document identified by the materialized view). For example, various access requests to query or otherwise read the materialized view, as indicated at 1227, may be supported.

The example diagrams discussed above with regard to FIGS. 5A-12 illustrate different interactions between relationship management 236 and other components. In some embodiments, some of these interactions may be performed synchronously where one component may wait upon the completion of a request by another component before continuing to perform a task. In other embodiments, some of these interactions may be performed asynchronously where one component does not wait upon the completion of a request by another component to continue performing a task. Various combinations of synchronous and asynchronous behavior may be implemented according to different performance characteristics desired for the application build, development, delivery, and deployment service 210. Similarly, for other embodiments of other types of applications implement relationship management and the interactions described above, other synchronous and asynchronous behavior may be used.

The application build, development, delivery, and deployment service discussed in FIGS. 2 through 12 provide examples of a system that may implement separate relationship management for application data objects. However, various other types of applications that utilize relationships between data objects to communicate or implement various application features may implement such techniques.

Figure 13:
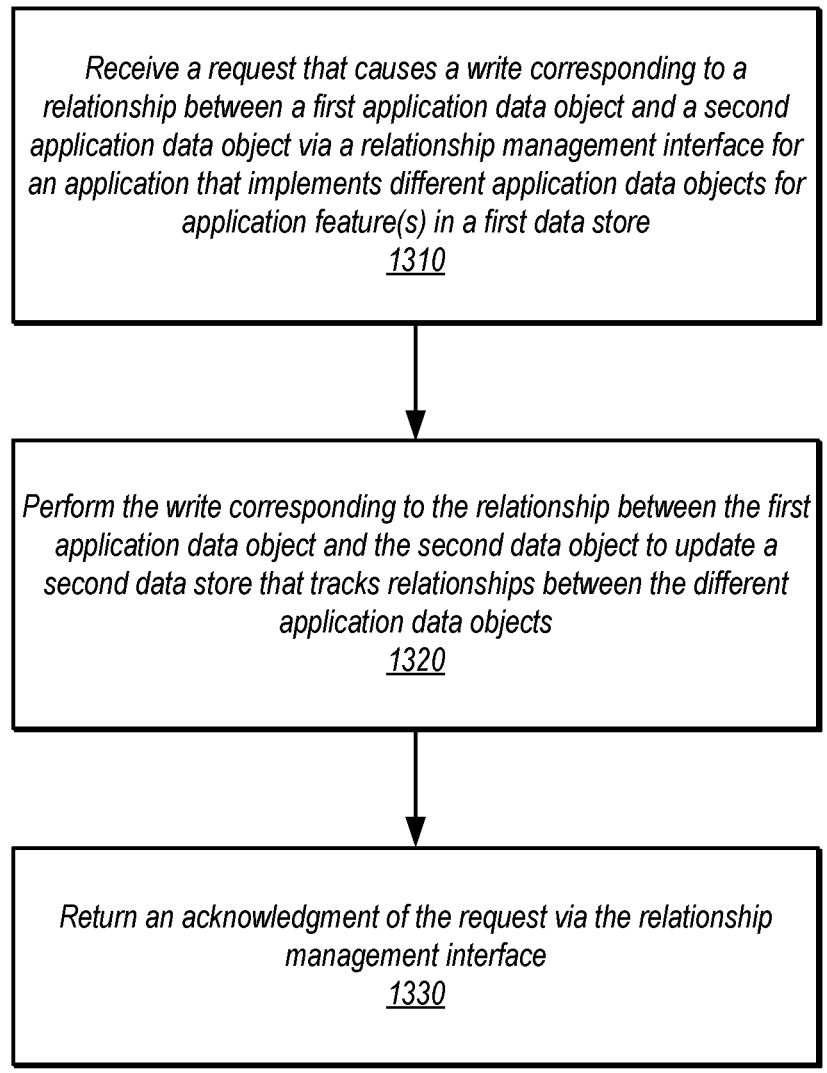
FIG. 13 is a high-level flowchart illustrating various methods and techniques that implement requests that cause writes for relationships between application data objects, according to some embodiments.

FIG. 13 is a high-level flowchart illustrating various methods and techniques that implement requests that cause writes for relationships between application data objects, according to some embodiments. Various different systems and devices may implement the various methods and techniques described below, either singly or working together. For example, an application build, development, delivery, and deployment service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 1310, a request may be received via a relationship management interface for an application that implements different application data objects for application feature(s) in a first data store that causes a write corresponding to a relationship between a first application data object and a second application data object, in some embodiments. For example, as discussed above various different types of requests may be received that cause writes corresponding to relationships between application data objects, such as a request to create an application data object, update an application object relationship (e.g., parent relationship, owner relationship, link association, etc.), delete an application data object, share an application data object, and/or move an application data object, among other requests. The request may be received directly from a client feature or component of an application (e.g., a tool plugin discussed above with regard to FIG. 2) or from a control plane component, such as change management 232 which may be performing a request directed to change management 232.

As indicated at 1320, the write may be performed corresponding to the relationship between the first application data object and the second application data object to update a second data store that tracks relationships between the different application data objects, in some embodiments. For example, the second data store may utilize a graph or other data structure to track relationships between application in a database or other data storage system that may include different records, entries, or objects that correspond to the application data objects. Such records, entries or objects may be written to add, update, remove, mark for deletion, or otherwise change corresponding to the request. For example, a request to create an application data object (e.g., a resource document creation request discussed above with regard to FIG. 6), may add a new record with various metadata (as discussed above with regard to FIG. 1), as well as a parent and/or owner relationship attribute or feature in the record that identifies another application data object as the parent/owner application data object of the newly created application data object. Likewise, writes to the second data store to update the tracking information for the various other requests that cause writes to a corresponding relationship (including operations to delete a relationship or application data object) may be performed.

As indicated at 1330, an acknowledgement of the request may be returned via the relationship management interface 1330, in some embodiments. In other scenarios where the write failed to perform, an error or other indication may be returned (e.g., to cause a retry or trigger error handling of an application feature).

Figure 14:
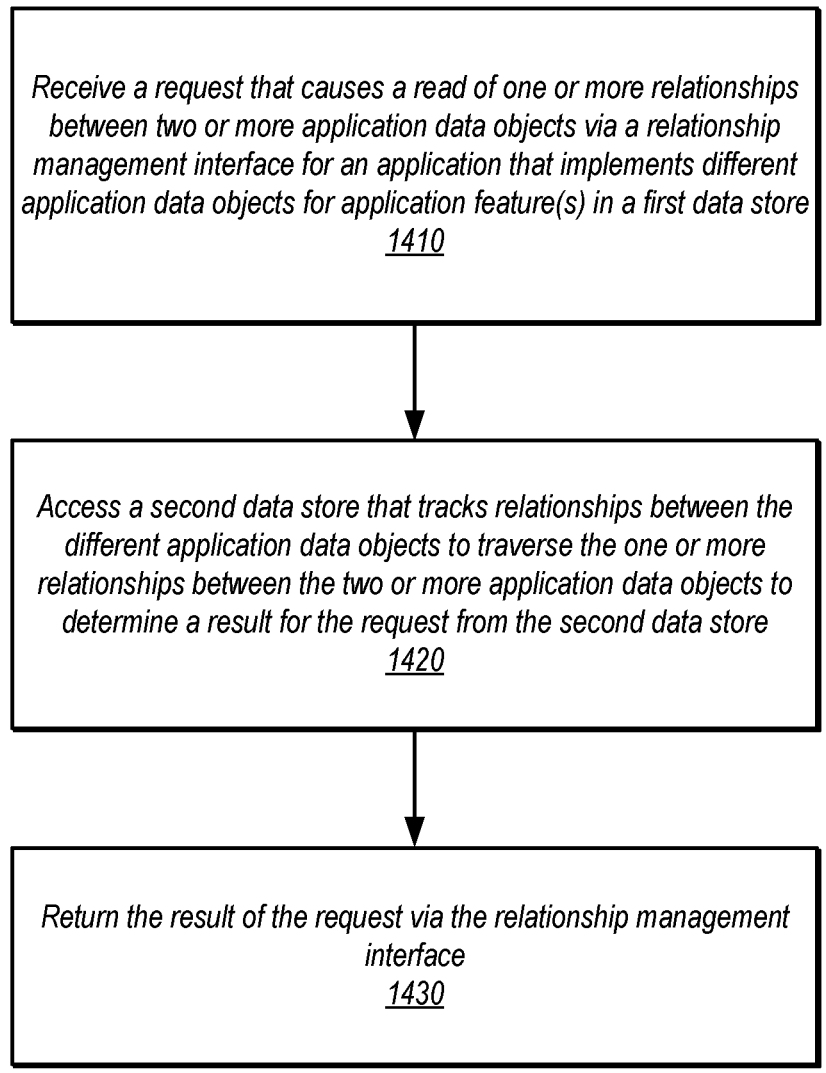
FIG. 14 is a high-level flowchart illustrating various methods and techniques that implement requests that cause reads of relationships between application data objects, according to some embodiments.

As discussed above, other requests received via a relationship management service may cause a read of relationships between application data objects. FIG. 14 is a high-level flowchart illustrating various methods and techniques that implement requests that cause reads of relationships between application data objects, according to some embodiments. As indicated at 1410, a request may be received that causes a read of one or more relationships between two or more application data objects via a relationship management interface for an application that implements different application data objects for application feature(s) in a first data store, in some embodiments. For example, as discussed in detail above, applications that cause reads of relationships may include requests to get an application data object (e.g., get a resource document), resolve an application data object, validate information for an application data object (e.g., an identifier), and/or list related application data objects (e.g., using materialized view of application data objects). The request may be received directly from a client feature or component of an application (e.g., a tool plugin discussed above with regard to FIG. 2) or from a control plane component, such as change management 232 which may be performing a request directed to change management 232.

As indicated at 1420, a second data store may be accessed that tracks relationships between the different application data objects to traverse the one or more relationships between the two or more application data objects to determine a result for the request from the second data store, in some embodiments. For example, an association, such as a hierarchical association may indicate a parent-child relationship between application data objects or owner-owned relationship between application data objects, which may be determined by examining or otherwise evaluating the relationships stored for the application data objects.

A graph or other data structure may be stored in the second data store that models both the relationships and application data objects. For instance, an application data object may have a corresponding application data object record or entry and one or more relationship attributes or features which identify other application data objects and the type of relationship, such as an application data object with relationship attribute of type parent and value of other application data object (which may be an identifier or other value that can be used to read or locate the record for the other application data object). Each relationship may have its own feature or attribute in the record for the application data object (e.g., one or more parent relationship features corresponding to each parent relationship, an owner relationship feature, a link association feature, etc.).

As indicated at 1430, the result of the request may be returned via the relationship management interface, in some embodiments. For example, the resolution of the resource document (e.g., by traversing the relationships between the different application data objects to identify a desired application data object) may be returned by returning the identifier of the resource document. In some embodiments, the result may include multiple application data objects (e.g., returning those application data objects that are parents of a given application data object).

Figure 15:
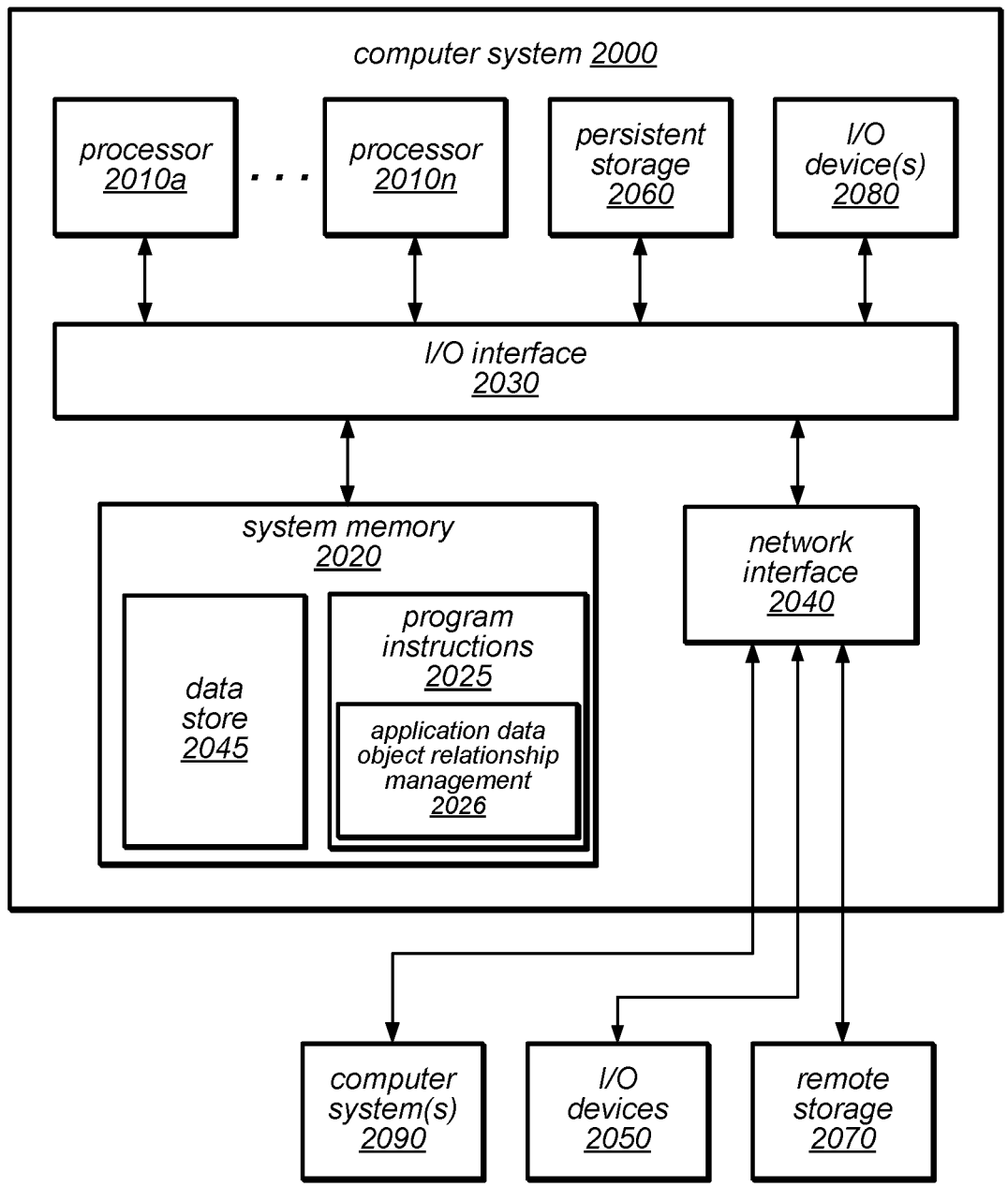
FIG. 15 is a block diagram illustrating an example computer system, according to various embodiments.

Any of various computer systems may be configured to implement processes associated with a technique for separate relationship management for application data objects as discussed with regard to the various figures above. FIG. 15 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 15 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for separate relationship management for application data objects, as indicated at 2026, for the downloadable software or provider network are shown stored within system memory 2020 as program instructions 2025. In some embodiments, system memory 2020 may include data store 2045 which may be configured as described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:
1. A system, comprising:
a document-based data store, storing a plurality of different application data objects for one or more application features of an application development, build, delivery, and deployment service;
a database, storing a graph that models relationships between the plurality of different application data objects, wherein the database is separate from the document-based data store;
at least one processor; and
a memory, storing program instructions that when executed by the at least one processor, cause the at least one processor to implement a control plane for an application, configured to:
  receive a request, via a first plugin for a first development tool that provides a relationship management interface, that specifies within the request a relationship between a first application data object and a second application data object, the request causing a write to implement the specified relationship between the first application data object and the second application data object;
  responsive to the receipt of the request:
    determine, by a change control management system, that the write can be performed based, at least in part, on one or more requests received via a second plugin for a second one or more development tools;
    send a request to perform the write to the database to update the graph in accordance with the specified relationship between the first application data object and the second application data object;

receive a response from the database that indicates successful completion of the write to the database to update the graph;

after receipt of the response from the database, return an acknowledgment of the request via the relationship management interface.

2. The system of claim 1, wherein the request that causes the write corresponding to the relationship between the first application data object and the second application data object is a request to create the first application data object and wherein the write includes an association between the first application data object and the second data object.

3. The system of claim 1, wherein the program instructions further cause the at least one processor to:

receive a second request that causes a read of one or more relationships between two or more of the plurality of application data objects via the relationship management interface;

access the database to traverse the one or more relationships between the two or more application data objects to determine a result for the request from the database; and return the result for the second request via the relationship management interface.

4. The system of claim 1, wherein the different application data objects correspond to different resource documents for one or more tools of the application development, build, delivery, and deployment service.

5. A method, comprising:

receiving a request, via a first plugin for a first development tool that provides a relationship management interface for an application, build, delivery, and deployment service, that specifies within the request a relationship between a first application data object and a second application data object, wherein the application development, build, delivery, and deployment service implements a plurality of different application data objects for one or more application features in a first data store, the request causing a write to implement the specified relationship between the first application data object and the second application data object;

responsive to receiving the request:

determining, by a change control management system, that the write can be performed based, at least in part, on one or more requests received via a second plugin for a second one or more development tools;

performing the write to implement the specified relationship between the first application data object and the second data object to update a second data store that tracks relationships between the plurality of different application data objects; and returning an acknowledgment of the request via the relationship management interface.

6. The method of claim 5, wherein the request is a request to create the first application data object and wherein the write includes hierarchical association between the first application data object and the second data object.

7. The method of claim 5, wherein the request is a request to share the first application data object with the second application data object and wherein the write includes a parent association between the first application data object and the second data object, wherein the second data object is a parent of the first data object in addition to a third application data object.

8. The method of claim 5, wherein the request is a request to link the first application data object with the second application data object and wherein the write includes a link association between the first application data object and the second data object.

9. The method of claim 5, further comprising:

receiving a second request that causes a read of one or more relationships between two or more of the plurality of application data objects via the relationship management interface;

accessing the second data store to traverse the one or more relationships between the two or more application data objects to determine a result for the request from the second data store; and returning the result for the second request via the relationship management interface.

10. The method of claim 9, wherein the second request is a request to resolve a path and wherein the result for the second request is an identifier for one of the application data objects identified by the path.

11. The method of claim 5, further comprising:

receiving a second request to rename one of the application data objects with a new name;

validating the new name is unique within a scope of a parent application data object identified in the second data store before performing a second write to the second data store to rename the one application data object with the new name.

12. The method of claim 5, further comprising:

receiving a second request that specifies one of the plurality of application data objects causes a deletion of two or more of the plurality of application data objects by recursively traversing relationships from the one application data object in the graph to delete the two more application data objects.

13. The method of claim 5, further comprising storing an indication of the write corresponding to the relationship between the first application data object and the second data object in the first data store, wherein the first data store sends a notification of the stored indication to one or more subscribers.

14. One or more non-transitory, computer-readable storage media, storing program instructions that when executed on or across one or more computing devices cause the one or more computing devices to implement:

receiving a request, via a first plugin for a first development tool that provides a relationship management interface for an application development, build, delivery, and deployment service, that specifies within the request a relationship between a first application data object and a second application data object, wherein the application development, build, delivery, and deployment service implements a plurality of different application data objects for one or more application features in a first data store, the request causing a write corresponding to the specified relationship between the first application data object and the second application data object;

responsive to receiving the request:

determining, by a change control management system, that the write can be performed based, at least in part, on one or more requests received via a second plugin for a second one or more development tools;

sending a request to perform the write to a second data store that stores a graph that models relationships between the plurality of different application data objects;

after receiving a response from the second data store indicating successful completion of the write to the second data store, returning an acknowledgment of the request via the relationship management interface.

15. The one or more non-transitory, computer-readable storage media of claim 14, wherein the request is a request to create the first application data object and wherein the write includes a parent-child association between the first application data object and the second data object, wherein the second data object is a parent of the first data object.

16. The one or more non-transitory, computer-readable storage media of claim 14, wherein the request is a request to move an association of the first application data object to the second application data object from a third data object, and wherein the write makes the second data object a parent of the first data object.

17. The one or more non-transitory, computer-readable storage media of claim 14, storing further instructions that when executed by the one or more computing devices cause the one or more computing devices to implement:
receiving a second request that causes a read of one or more relationships between two or more of the plurality of application data objects via the relationship management interface;
accessing the second data store to traverse the one or more relationships between the two or more application data objects to determine a result for the request from the second data store; and
returning the result for the second request via the relationship management interface.

18. The one or more non-transitory, computer-readable storage media of claim 17, wherein the second request is a request to get one of the two or more application data objects, and wherein the result comprises an indication of the one or more relationships and metadata stored in the second data store for the one application data object.

19. The one or more non-transitory, computer-readable storage media of claim 14, storing further instructions that when executed by the one or more computing devices cause the one or more computing devices to implement storing an indication of the write corresponding to the relationship between the first application data object and the second data object in the first data store, wherein the first data store sends a notification of the stored indication to one or more subscribers.

20. The one or more non-transitory, computer-readable storage media of claim 14, wherein the different application data objects correspond to different resource documents for one or more tools of the application development, build, delivery, and deployment service.

* * * * *